(12) United States Patent
Moorer

(10) Patent No.: US 8,588,462 B1
(45) Date of Patent: *Nov. 19, 2013

(54) VIDEO WATERMARKING WITH FAST DETECTION

(75) Inventor: James A. Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,191

(22) Filed: Sep. 13, 2012

Related U.S. Application Data

(63) Continuation of application No. 12/202,071, filed on Aug. 29, 2008, now Pat. No. 8,320,606.

(51) Int. Cl.
*G06K 9/00* (2006.01)
*H04L 9/32* (2006.01)

(52) U.S. Cl.
USPC .......................................... 382/100; 713/176

(58) Field of Classification Search
USPC .............. 382/100, 232, 240; 380/51, 54, 201, 380/210, 252, 287; 370/522–529; 283/72, 283/74–81, 85, 93; 713/176, 179; 358/3.28; 348/461, 463
See application file for complete search history.

(56) References Cited

U.S. PATENT DOCUMENTS

| | | |
|---|---|---|
| 5,170,440 A | 12/1992 | Cox |
| 5,359,362 A | 10/1994 | Lewis et al. |
| 5,363,305 A | 11/1994 | Cox et al. |
| 5,383,013 A | 1/1995 | Cox |
| 5,644,651 A | 7/1997 | Cox et al. |
| 5,696,964 A | 12/1997 | Cox et al. |
| 5,727,080 A | 3/1998 | Cox et al. |
| 5,734,592 A | 3/1998 | Cox et al. |
| 5,751,838 A | 5/1998 | Cox et al. |
| 5,774,576 A | 6/1998 | Cox |
| 5,848,155 A | 12/1998 | Cox |
| 5,915,027 A | 6/1999 | Cox et al. |
| 5,930,369 A | 7/1999 | Cox et al. |
| 5,991,426 A | 11/1999 | Cox et al. |
| 6,069,914 A | 5/2000 | Cox |
| 6,078,688 A | 6/2000 | Cox et al. |
| 6,108,434 A | 8/2000 | Cox et al. |
| 6,154,571 A | 11/2000 | Cox et al. |

(Continued)

OTHER PUBLICATIONS

Ahumada Jr., et al., "Computational Image Quality Metrics: A Review," 1-5 (1993).

(Continued)

*Primary Examiner* — Abolfazl Tabatabai
(74) *Attorney, Agent, or Firm* — Wolfe-SBMC

(57) ABSTRACT

In general, one aspect of the subject matter described in this specification can be embodied in a system that includes a user interface device; and one or more computers operable to interact with the user interface device and to perform operations including: receiving video data; applying a one dimensional watermark pattern to each of multiple one dimensional data lines in the video data to create watermarked video data; receiving the watermarked video data including the multiple one dimensional data lines; combining the one dimensional data lines to form a one dimensional array of numbers; analyzing the one dimensional array of numbers to detect the one dimensional watermark pattern previously applied to each of the one dimensional data lines; and outputting an indication of a match, to trigger further processing with respect to the watermarked video data, when the analyzing indicates the watermark pattern has been detected.

20 Claims, 11 Drawing Sheets

(56) References Cited

U.S. PATENT DOCUMENTS

| | | | |
|---|---|---|---|
| 6,208,735 B1 | 3/2001 | Cox et al. | |
| 6,278,792 B1 | 8/2001 | Cox et al. | |
| 6,282,300 B1 | 8/2001 | Bloom et al. | |
| 6,332,194 B1* | 12/2001 | Bloom et al. | 713/176 |
| 6,614,914 B1* | 9/2003 | Rhoads et al. | 382/100 |
| 6,724,911 B1 | 4/2004 | Cox et al. | |
| 6,738,493 B1 | 5/2004 | Cox et al. | |
| 6,795,565 B2 | 9/2004 | Wendt | |
| 6,996,249 B2 | 2/2006 | Miller et al. | |
| 7,058,223 B2 | 6/2006 | Cox | |
| 7,058,697 B2 | 6/2006 | Rhoads | |
| 7,197,164 B2* | 3/2007 | Levy | 382/100 |
| 7,593,543 B1 | 9/2009 | Herz et al. | |
| 7,636,451 B2* | 12/2009 | Isogai | 382/100 |
| 2007/0276670 A1 | 11/2007 | Pearlstein | |
| 2008/0250240 A1 | 10/2008 | Celik et al. | |
| 2009/0002480 A1 | 1/2009 | Cutler | |
| 2009/0220070 A1 | 9/2009 | Picard et al. | |
| 2010/0322463 A1 | 12/2010 | Celik | |

OTHER PUBLICATIONS

Akansu et al., "Guest Editorial Special Issue on Signal Processing for Data Hiding in Digital Media and Secure Content Delivery," *IEEE Transactions on Signal Processing*, 51(4):897 (2003).

Alattar et al., "Digital Watermarking of Low Bit-Rate Advanced Simple Profile MPEG-4 Compressed Video," *IEEE Transactions on Circuits and Systems for Video Technology*, 13(8):787-800 (2003).

Alattar and Meyer, "Watermark Re-Synchronization Using Log-Polar Mapping of Image Autocorrelation," 4 pages (2003).

Barni, "What Is the Future for Watermarking? (Part I)," *IEEE Signal Processing Magazine*, 56-60 (2003).

Barni, "What Is the Future for Watermarking? (Part II)," *IEEE Signal Processing Magazine*, 53-57 (2003).

Bassia et al., "Robust Audio Watermarking in the Time Domain," *IEEE Transactions on Multimedia*, 3(2):232-241 (2001).

Buchsbaum, "An Analytical Derivation of Visual Nonlinearity," *IEEE Transactions on Biomedical Engineering*, 27(5):237-242 (1980).

Buchsbaum, "The Retina as a Two-Dimensional Detector Array in the Context of Color Vision Theories and Signal Detection Theory," *Proceedings of the IEEE*, 69(7):772-786 (1981).

Busch, "Digital Watermarking: From Concepts to Real-Time Video Applications," *IEEE Computer Graphics and Applications*, 25-35 (1999).

Cayre et al., "Watermarking Security: Theory and Practice," *IEEE Transactions on Signal Processing*, 53(10):3976-3987 (2005).

Cheng and Huang, "Robust Optimum Detection of Transform Domain Multiplicative Watermarks," *IEEE Transactions on Signal Processing*, 51(4):906-924 (2003).

Cohen et al., "Biorthogonal Bases of Compactly Supported Wavelets," *Communications on Pure and Applied Mathematics*, XLV:485-560 (1992).

Cox et al., "Secure Spread Spectrum Watermarking for Images, Audio and Video," *Proc. IEEE*, 243-246 (1996).

Cox et al., "Secure Spread Spectrum Watermarking for Multimedia," *IEEE Transactions on Image Processing*, 6(12):1673-1687 (1997).

Cox and Linnartz, "Some General Methods for Tampering with Watermarks," *IEEE Journal on Selected Areas in Communications*, 16(4):587-593 (1998).

Cox and Miller, A review of watermarking and the importance of perceptual modeling,, *SPIE*, (316):96-99 (1997).

Cox and Miller, "Electronic Watermarking: The First 50 Years," *IEEE*, 225-230 (2001).

Cox et al., "Digital Watermarking. Chapter 2: Applications and Properties," *Academic Press*, 11-40 (2002).

Cox et al., "Watermarking applications and their properties," 5 pages (2003).

Cox et al., "Watermarking as Communications with Side Information," *Proceedings of the IEEE*, 87(7):1127-1141 (1999).

Daly, "A Visual Model for Optimizing the Design of Image Processing Algorithms," *IEEE*, 16-20 (1994).

de Vleeschouwer et al., "Invisibility and Application Functionalities in Perceptual Watermarking—An Overview," *Proceedings of the IEEE*, 90(1):64-77 (2002).

Delaigle et al., "A Psychovisual Approach for Digital Picture Watermarking," 29 pages (at least as early as Aug. 28, 2008).

Delaigle et al., "Human Visual System Features Enabling Watermarking," *IEEE*, 489-492 (2002).

Digimarc Patent Portfolio [online] [retrieved on Jul. 18, 2008]. Retrieved from the Internet: https://www.digimarc.com/tech/patent_list.asp.

Fei et al., "The Choice of Watermark Domain in the Presence of Compression," *IEEE*, 79-84 (2001).

Ganjam and Zhang, "Internet Multicast Video Delivery," *Proceedings of the IEEE*, 93(1):159-170 (2006).

Hartung et al., "Multimedia Watermarking Techniques," *Proceedings of the IEEE*, 87(7):1079-1107 (1999).

Herley, "Why Watermarking Is Nonsense," *IEEE Signal Processing Magazine*, 10-11 (2002).

Jayant et al., "Signal Compression Based on Models of Human Perception," *Proceedings of the IEEE*, 81(10):1385-1422 (1993).

Kalker et al., "Music2Share—Copyright-Compliant Music Sharing in P2P Systems," *Proceedings of the IEEE*, 92(6):961-970 (2004).

Klein et al., "Seven models of masking," *SPIE*, 3016:13-24 (1997).

Kundur and Hatzinakos, "Digital Watermarking Using Multiresolution Wavelet Decomposition," *IEEE*, 2969-2972 (1998).

Kundur and Hatzinakos, "Digital Watermarking for Telltale Tamper Proofing and Authentication," *Proceedings of the IEEE*, 87(7):1167-1180 (1999).

Kundur and Karthik, "Video Fingerprinting and Encryption Principles for Digital Rights Management," *Proceedings of the IEEE*, 92(6): 918-932 (2004).

Kutter, "Performance Improvement of Spread Spectrum Based Image Watermarking Schemes Through M-ary Modulation," published in *Lecture Notes in Computer Science*, 16 pages (1999).

Kutter, "Digital Image Watermarking: Hiding Information in Images," 11 pages (1999).

Kutter et al., "Towards Second Generation Watermarking Schemes," 4 pages (1999).

Lin et al., "Advances in Digital Video Content Protection," *Proceedings of the IEEE*, 93(1):171-183 (2005).

Lin et al., "Rotation, Scale, and Translation Resilient Watermarking for Images," *IEEE Transactions on Image Processing*, 10(5):767-782 (2001).

Lin et al., "Image Authentication Based on Distributed Source Coding," 4 pages (2007).

Lin et al., "Image Authentication and Tampering Localization using Distributed Source Coding," 4 pages (2007).

Lin et al., "Spatial Models for Localization of Image Tampering Using Distributed Source Codes," (4 pages) (2007).

Macq et al., "Benchmarking of Image Watermarking Algorithms for Digital Rights Management," *Proceedings of the IEEE*, 92(6):971-984 (2004).

Malvar and Florêncio, "Improved Spread Spectrum: A New Modulation Technique for Robust Watermarking," *IEEE Transactions on Signal Processing*, 51(4):898-905 (2003).

Maris, Stefan, "Content Identification," Mar. 18, 2008, 14 pages.

Miller et al., "Dirty-Paper Trellis Codes for Watermarking," *IEEE*, II-129-132 (2002).

Miller et al., "Watermarking in the Real World: An Application to DVD," *IEEE*, 1496-1502 (1999).

Miller et al., "Applying Informed Coding and Embedding to Design a Robust High-Capacity Watermark," *IEEE Transactions on Image Processing*, 13(6):792-807 (2004).

Moulin, "Comments on "Why Watermarking is Nonsense"," *IEEE Signal Processing Magazine*, 57-59 (2003).

Moulin and Koetter, "Data-Hiding Codes," *Proceedings of the IEEE*, 93(12):2083-2126 (2005).

Nikolaidis and Pitas, "Region-Based Image Watermarking," *IEEE Transactions on Image Processing*, 10(11):1726-1740 (2001).

Podilchuk and Zeng, "Digital image watermarking using visual models," *SPIE*, 3016:100-111 (1997).

(56) References Cited

OTHER PUBLICATIONS

Resnikoff et al., "Biorthogonal Wavelet Space: Parametrization and Factorization," submitted to *SIAM Journal on Mathematical Analysis*, 21 pages (1999).
Slepian and Wolf, "Noiseless Coding of Correlated Information Sources," *IEEE Transactions on Information Theory*, IT-19(4):471-480 (1973).
Smith, "Perception of temporal continuity in discontinuous moving images," 1 page (2004).
Su et al., "A Content-Dependent Spatially Localized Video Watermark for Resistance to Collusion and Interpolation Attacks," *IEEE*, 818-821 (2001).
Swanson et al., "Transparent Robust Image Watermarking," *IEEE*, 211-214 (1996).
Tang and Hang, "A Feature-Based Robust Digital Image Watermarking Scheme," *IEEE Transactions on Signal Processing*, 51(4):950-959 (2003).
Varodayan et al. "Audio Authentication Based on Distributed Source Coding," 4 pages (2008).
Voloshynovskiy et al., "A Stochastic Approach to Content Adaptive Digital Image Watermarking," printed by *Digital Copyright Technologies*, Switzerland, 19 pages (at least as early as Aug. 28, 2008).
Voloshynovskiy et al., "A Stochastic Approach to Content Adaptive Digital Image Watermarking," 26 pages (1999).
Voyatzis et al., "Digital Watermarking: An Overview," 4 pages (19998).
Watson et al., "Image quality and entropy masking," *SPIE*, 3016:1-12 (1997).
Wolfgang and Podilchuk, "Perceptual Watermarks for Digital Images and Video," *Proceedings of the IEEE*, 87(7):1108-1126 (1999).
Wu et al., "A Rotation, Scale and Translation Resilient Public Watermark," *IEEE*, 2065 (1999).
Zhao and Koch, "A Digital Watermarking System for Multimedia Copyright Protection," *ACM Multimedia*, 443-444 (1996).
Zhao and Koch, "Embedding Robust Labels into Images for Copyright Protection," *In: Proc. of the Int. Congress on Intellectual Property Rights for Specialized Information, Knowledge and New Technologies*, Vienna, 10 pages (1995).
Hunter, Response to Non-Final Office Action filed Jul. 12, 2012, U.S. Appl. No. 12/202,071, 11 pages, to be published by USPTO.
USPTO, Non-Final Office Action mailed Apr. 13, 2012, U.S. Appl. No. 12/202,071, 10 pages, to be published by USPTO.
Hunter, Response to Non-Final Office Action filed Jan. 30, 2012, U.S. Appl. No. 12/202,071, 12 pages, to be published by USPTO.
USPTO, Non-Final Office Action mailed Nov. 9, 2011, U.S. Appl. No. 12/202,071, 11 pages, to be published by USPTO.
USPTO, Non-Final Office Action mailed Jun. 1, 2012, U.S. Appl. No. 12/265,507, 16 pages, to be published by USPTO.
Hunter, Response to Non-Final Office Action filed Jul. 12, 2012, U.S. Appl. No. 12/265,507, 15 pages, to be published by USPTO.
"Notice of Allowance", U.S. Appl. No. 12/202,071, (Sep. 6, 2012), 12 pages.

\* cited by examiner

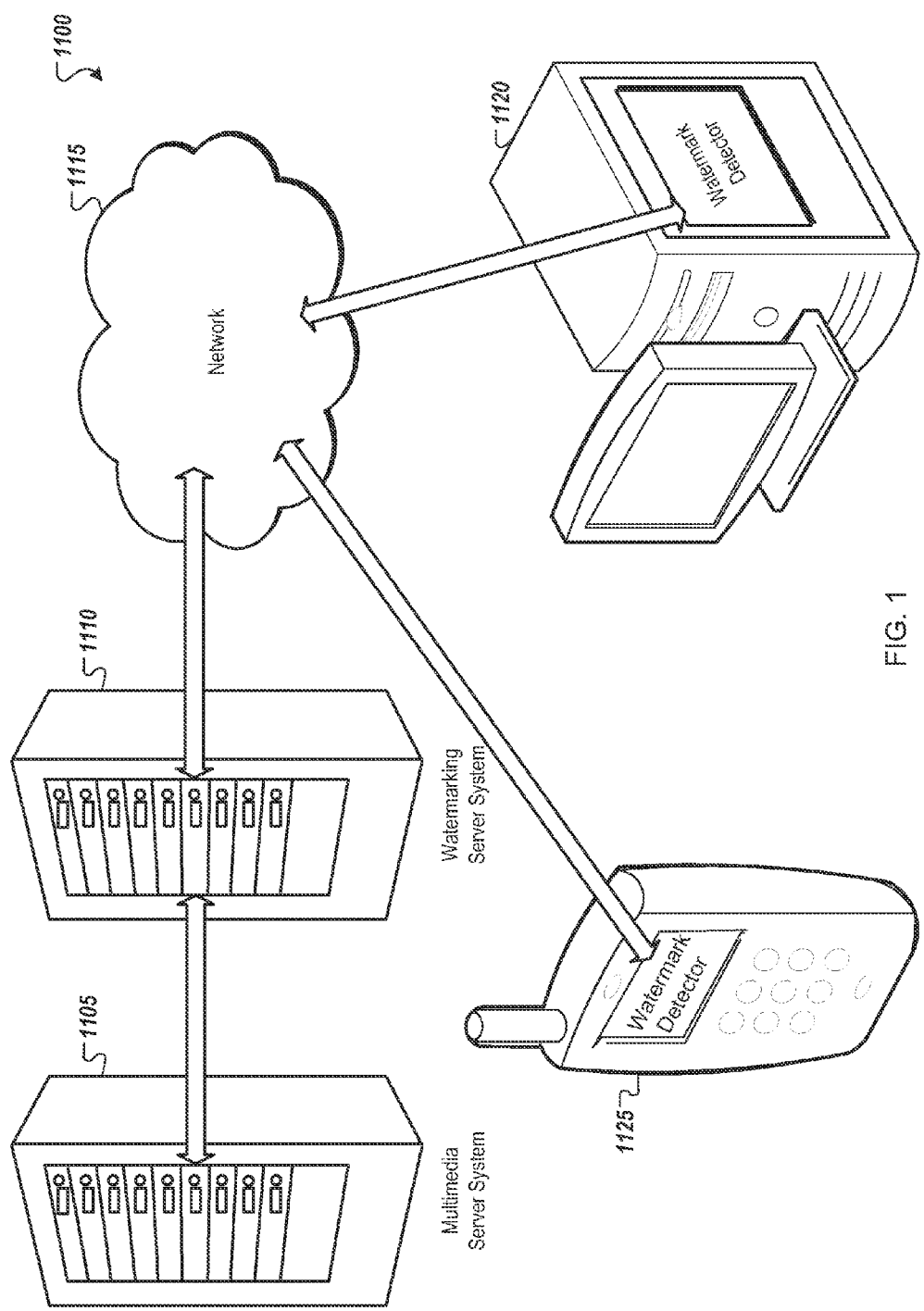

VIDEO WATERMARKING WITH FAST DETECTION

CROSS-REFERENCE TO RELATED APPLICATION

This application is a continuation application of and claims priority to U.S. patent application Ser. No. 12/202,071, filed Aug. 29, 2008; the disclosure of the prior application is considered part of (and is incorporated by reference in) the disclosure of this application.

BACKGROUND

The present disclosure relates to applying and detecting electronic watermarks in video data.

Electronic watermarking involves the embedding of an imperceptible or difficult to perceive signal into a work. Common types of works include pictures, video, and audio. Works can then be analyzed later to determine if a watermark is present within that particular work. Watermarking schemes typically balance a number of competing factors. It is generally desirable to make a watermark as imperceptible to human detection as possible so that it does not draw the attention of the audience of the work. This goal is often at odds with the ability to detect watermarks accurately, because imperceptible watermarks are generally less differentiated from the original work. Some watermarks are designed to be robust against manipulations that the associated work can undergo, such as compression, cropping, or distortion. Other watermarks are designed to be less robust in the process of making such watermarks less perceptible.

SUMMARY

This specification describes technologies relating to applying and detecting electronic watermarks in video data.

In general, one aspect of the subject matter described in this specification can be embodied in a system that includes a user interface device; and one or more computers operable to interact with the user interface device and to perform operations including: receiving video data; applying a one dimensional watermark pattern to each of multiple one dimensional data lines in the video data to create watermarked video data; receiving the watermarked video data including the multiple one dimensional data lines; combining the one dimensional data lines to form a one dimensional array of numbers; analyzing the one dimensional array of numbers to detect the one dimensional watermark pattern previously applied to each of the one dimensional data lines; and outputting an indication of a match, to trigger further processing with respect to the watermarked video data, when the analyzing indicates the watermark pattern has been detected. Other embodiments of this aspect include corresponding methods, apparatus, and computer program products.

These and other embodiments can optionally include one or more of the following features. The one or more computers can include a client computing system, including the user interface device, and a server computing system operable to interact with the client computing system through a data communication network. The one dimensional watermark pattern can include a sinusoid watermark pattern, and the applying can include applying multiple different sinusoid watermark patterns to different frames of the video data. Moreover, the one dimensional data lines can include at least one of horizontal lines, vertical lines, diagonal lines, radial lines, or concentric circles.

The operations can further include generating the one dimensional watermark pattern to encode multiple bits of data, and the applying can include applying the multi-bit watermark pattern to one dimensional data lines from different frames of the video data, including at least two data lines from each of the different frames. The applying can include, for each of the one dimensional data lines: producing a one dimensional data pattern from a gain factor, the one dimensional watermark pattern, and a perceptual weighting derived from at least a current one dimensional data line of the multiple one dimensional data lines; and combining the one dimensional data pattern with the current one dimensional data line in the video data.

The watermark pattern can include a sinusoid, and the analyzing can include employing a Fourier transform to detect the sinusoid. The analyzing can include using a matched filter to detect the watermark pattern. The one dimensional data lines can include scan lines of the video data, and the combining can include adding the scan lines together to form the one dimensional array of numbers. Moreover, the scan lines can include scan lines from different frames of the video data.

Particular embodiments of the subject matter described in this specification can be implemented to realize one or more of the following advantages. Detection of a watermark by a video playback device can provide support to robust rights management schemes, the association of metadata with the video, or the aggregation of viewer demographic data. Watermark detection can be added to a video playback chain using a technique that need not require a large memory footprint and can satisfy strict processing time requirements in a media player. Fast detection of watermarks can result in cost effective filtering of a large amount of video content. The monitoring of broadcast videos can result in the assurance that paid content such as commercial advertisements are being broadcast. Computationally efficient detection of watermarks can result in the implementation of watermark detection on electronic devices with limited computational ability or battery power, such as mobile computing and phone devices. The size of the watermark pattern can be relatively small, since it is one dimensional. Thus, systems employing these techniques can readily search for multiple different watermarks, which can be fully known and recorded before detection begins since storage of small watermarks can be accomplished with minimal memory requirements.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 1 is a block diagram showing an example system employing video watermarking with fast detection.

Like reference numbers and designations in the various drawings indicate like elements.

DETAILED DESCRIPTION

FIG. 1 is a block diagram showing an example system (1100) employing video watermarking with fast detection. An organization can utilize a video distribution and monitoring system (1100) to distribute a watermarked video and collect viewership information related to the video. The distribution system (1100) can include a multimedia server system (1105) and a watermarking server system (1110). The watermarking server system (1110) can utilize a shared network (1115) such as the Internet to communicate with remote clients (1120 and 1125). Other configurations of the distribution system (1100) are possible, including fewer and/or more of each individual element.

In some implementations, the multimedia server system (1100) can contain a library of multimedia files including, but not limited to, video files for public distribution. The multimedia server system (1105) can communicate with the watermarking server system (1110). The watermarking server system (1110) can receive video files from the multimedia server system (1105) and can embed a watermark into the video file. In some implementations, the multimedia server system (1105) and the watermark server system (1110) can be the same system (e.g., a single server farm or a single server machine).

The watermark server system (1110) can communicate with remote clients over the shared network (1115). In some implementations, the shared network (1115) can include the Internet, cellular telephone networks, and/or broadcast, cable, or satellite TV networks. In addition, the shared network (1115) can include non-electronic components, such as the United States Postal Service, through which videos, e.g., on Digital Versatile Discs (DVDs), can be distributed.

The remote clients (1120 and 1125) can be a desktop computer (1120) and a mobile phone (1125). Other remote clients (1120 and 1125) can also include a television, or personal music player capable of displaying video. The remote clients (1120 and 1125) can obtain (e.g., request and receive) videos from the watermarking server system (1110) or from other sources. When such videos are played, the remote clients (1120 and 1125) can verify that a watermark is in the video, and then engage in further processing based the discovery of the watermark. This can involve reporting the discovery of the watermark to the watermarking server system (1110), which can record statistics regarding the videos that are being displayed.

In addition, the remote clients (1120 and 1125) can incorporate watermarks into videos that are created on the respective computers, and communicate information regarding such watermarks back to the watermarking server system (1110). Thus, the watermarking server system (1110) can also record statistics regarding the playing of videos that are created using individual computers throughout the video distribution and monitoring system (1100).

Figure 2A:
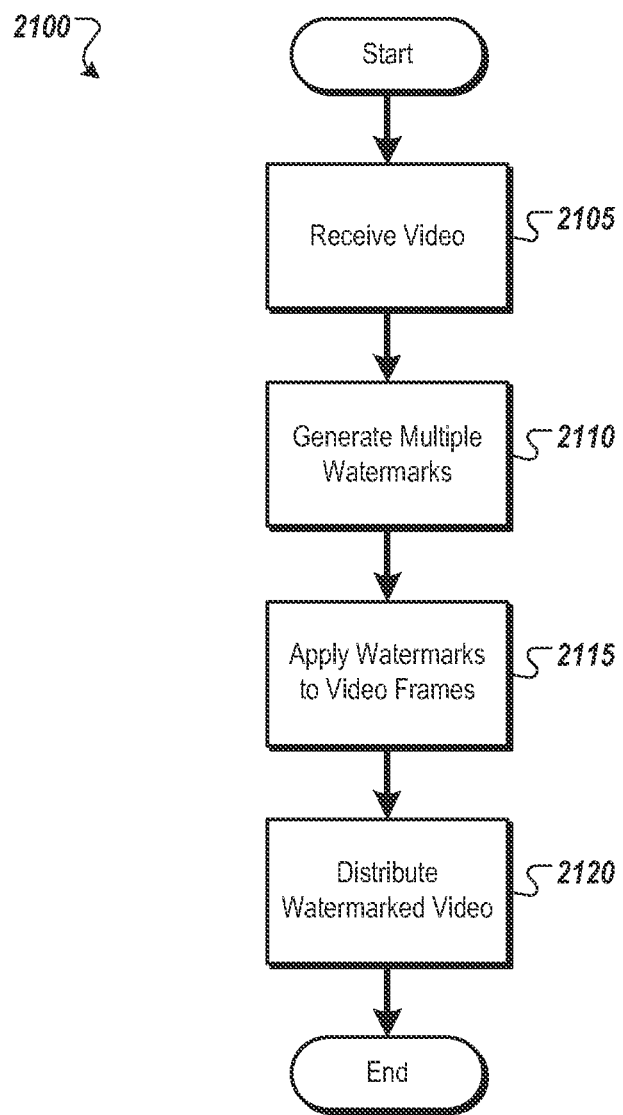
FIG. 2A is a flow chart showing an example process of adding a watermark to video data.

FIG. 2A is a flow chart showing an example process (2100) of adding a watermark to video data. A video can be received (2105) by a computer that can embed watermarks in video data. Receiving (2105) a video can involve the creation of a video, the addition of a video to a video library, and/or preparing to release copies of a video.

Multiple watermarks can be generated (2110). In some implantations, these watermarks can be created based in part or in whole on the video data received. In some implementations, additional data can be encoded into these watermarks. For example, a bit stream can be encoded in changes in amplitude or frequency between different sinusoid watermarks. In some implementations, a number (comparable to a barcode) can be encoded into one or more watermarks. In other implementations, only a single bit of information need be encoded into a watermark, where the single bit simply indicates that the video at hand has been watermarked by a given system.

One or more watermarks can be applied (2115) to one or more video frames. One watermark can be applied to each frame to be watermarked. The same watermark can be applied to more than one frame. More than one watermark can be applied to the same frame. All frames can have one or more watermarks applied, or some frames can have no watermark applied.

For example, for an image of size R×C, a watermark pattern of C numbers can be used to form the base pattern, which can be duplicated on all R rows, typically after some modification. The base pattern can be weighted with an "invisibility function" that seeks to find places in the image being watermarked where the eye is less sensitive to the presence of the watermark. The watermark can be added with high amplitude in the places where it is calculated that the eye will be less sensitive, and can be added with low amplitude in places where the eye is more sensitive. Note that there are many known techniques relating to how to form such an invisibility function from an image.

Once the video has been watermarked, the video can then be distributed (2120). In some implementations, video distribution can include the sale of a video or rights to publicly show the video. In some implementations, video distribution can include uploading of a video to an Internet web page for public viewing. In some implementations, video distribution can include the renting of the video for private viewing.

Figure 2B:
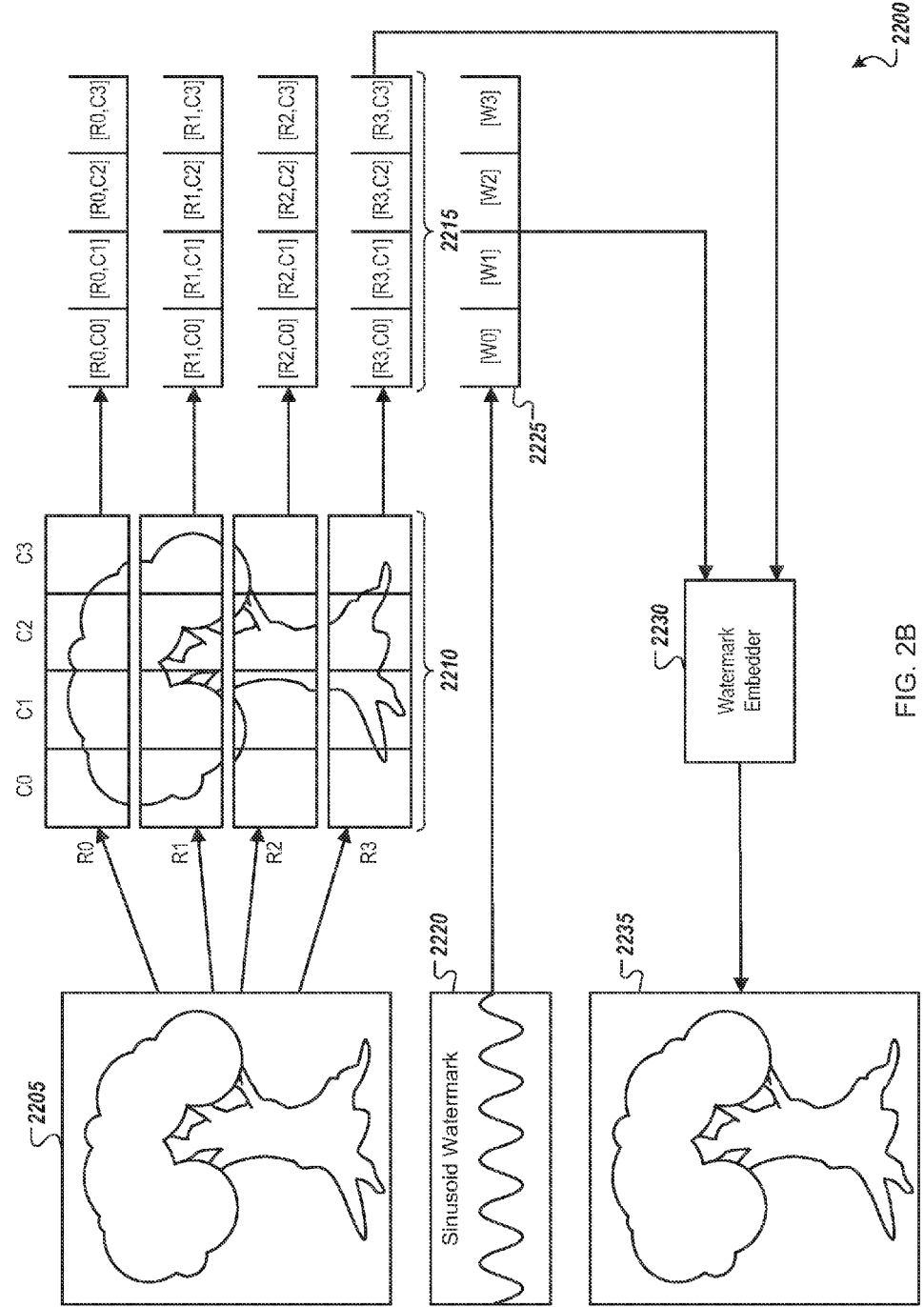
FIG. 2B is a block diagram showing another example process of adding a watermark to video data.

FIG. 2B is a block diagram showing an example process (2200) of adding a sinusoid watermark (2220) to a frame (2205) of a video. In some implementations, the frame (2205) can be separated into one or more scan lines (2210) corresponding to rows of data (R0, R1, R2, R3) in the image, which can be divided into columns (C0, C1, C2, C3). It should be noted that the scan lines (2210) are a stylized image and the size of the row-column blocks relative to the video image in the frame (2205) in the figure are for illustrations purposes only. The row and column blocks here represent the basic elements of the frame (2205), such as pixels.

The scan lines (2210) can be treated as a two dimensional array (2215). A base pattern of C numbers can be created in light of various considerations, such as minimizing visibility, maximizing robustness to transcoding, and so on. For example, a number of simple sinusoids can be chosen as base patterns. Such sinusoids can vary in frequency from twelve to eighteen cycles across the image, which can improve the ability of the watermarks to survive transcoding processes unaffected (e.g., without being swamped by large, blank areas of the image, such as blue sky, or being completely eliminated by the transcoding process itself). Note that such sinusoid watermarks can have improved survivability with respect to typical video compression techniques, such as MPEG (Moving Pictures Experts Group) compression since use of sinusoid watermarks can concentrate the energy in one frequency bin, which can force the compression algorithm to allocate bits to that particular bin, thereby causing the watermark to survive compression better than some other watermarks can. Moreover, other frequencies are also possible, both in the present sinusoid examples, and other example watermarks. For example, the frequencies employed can run from ninety to one hundred and thirty cycles.

In some implementations, each base pattern can consist of only one sinusoid at a time, and these sinusoids can be made orthogonal, since that can eliminate any interference between different patterns. Thus, some implementations can employ fourteen different base patterns, at frequencies 12, 13, ... 18, plus the arithmetic negative of these, which are also detectable patterns. For implementations that provide increased allowance for cropping or uncertainty in the width of the image, the number of patterns employed can be limited to just three or even two patterns, such as 12, 15, and 18 cycles, or even just 12 and 18 cycles because close spatial frequencies can be confused. For implementations that tolerate extremes of cropping, the number can be limited to just one frequency and either detect its presence (or that of its negative) or absence. For implementations that minimize visibility of a watermark, 90 to 130 cycles can be employed. Thus this technique can be tailored to a range of target systems depending on the exact level of robustness required by taking a tradeoff between the number of patterns and the robustness.

The sinusoid watermark (2220) can be created and converted to a one dimensional array (2225) of weighted values (W0, W1, W2, W3). A watermark embedder (2230) can embed the one dimensional array (2225) into each row of the two dimensional array (2215). The watermark embedder (2230) can output a frame (2235) of video with the sinusoid watermark (2220) embedded.

Figure 2C:
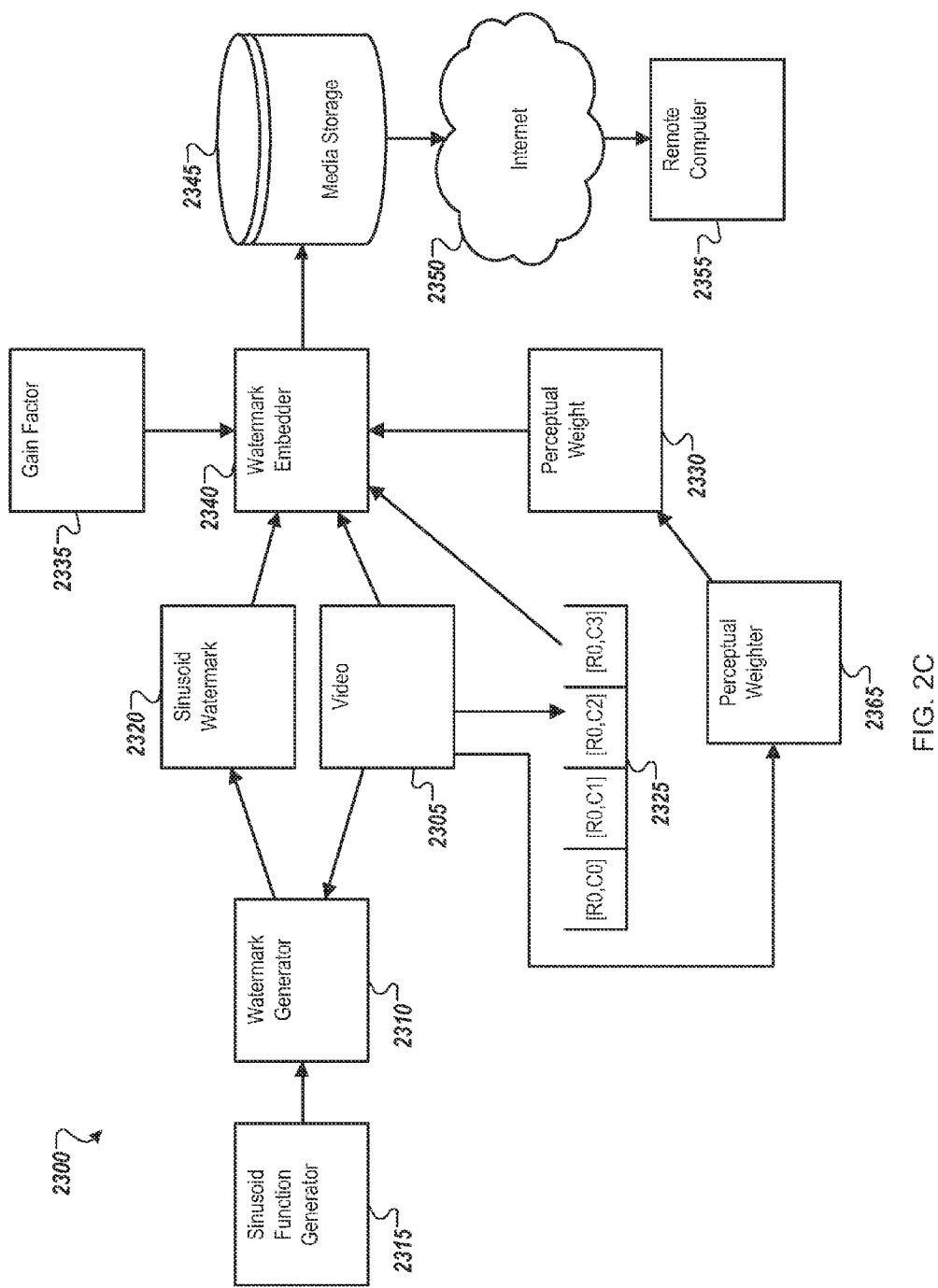
FIG. 2C is a block diagram showing an example video distribution system used to distribute a watermarked video.

FIG. 2C is a block diagram showing an example video distribution system (2300) used to distribute a watermarked video (2305). The video (2305) can be examined by a watermark generator (2310). The watermark generator (2310) can create a sinusoid watermark (2320) using a sinusoid function generator (2315) and the video (2305) data. In some implementations, the number of cycles in the sinusoid watermark (2320) can be optimized for the expected use of the watermark. In some implementations, the sinusoid watermark (2320) can include a number of cycles ranging from twelve to eighteen. In some implementations, the sinusoid watermark (2320) can include only a single cycle.

A watermark embedder (2340) can embed the sinusoid watermark (2320) into each scan line (2325) of the video (2305). The watermark embedder (2340) can use a gain factor (2335) and a perceptual weight (2330) to calculate a one dimensional data pattern for each scan line (2325). The perceptual weight (2330) can be calculated at each pixel in each scan line (2325) by a perceptual weighter (2365), which can take each video (2305) frame as input and produce perceptual weights (2330) as output that are in turn factored into the watermark (2320) before it is added to that frame's image. Thus, for an image I(R,C), the watermarked image I'(R,C) can be given by $I(R,C)+G \cdot P(C) \cdot W(R,C)$, where G is the gain factor (2335), P is the base watermark pattern, and W is the perceptual weight (2330), which can be computed from a model of the human visual system. Some models suggest that human vision does not see blue light very well, thus W(R,C) can be determined based on the amount s5 of blue in a pixel. Moreover, more of the watermark can be embedded into the blue channel, as opposed to the red or green channels. Some models also suggest that more information can be hidden in areas of higher spatial frequencies than in lower spatial frequencies, and thus higher frequencies can be selected as well.

The video (2305) can be stored in a media storage (2345). The Internet (2350) can provide a remote computer (2355) with access to the media storage (2345). In some implementations, some or all of the components in the system (2300) can be computer software components such as programs, daemons, services, or data files. In some implementations, some or all of the components in the system (2300) can be computer hardware components such as hard disks, network cables, applications-specific integrated circuits or general purpose microprocessors. Moreover, the components in the system (2300) need not be separated as shown; for example, the sinusoid function generator (2315) can be integrated into the watermark generator (2310).

Figure 2D:
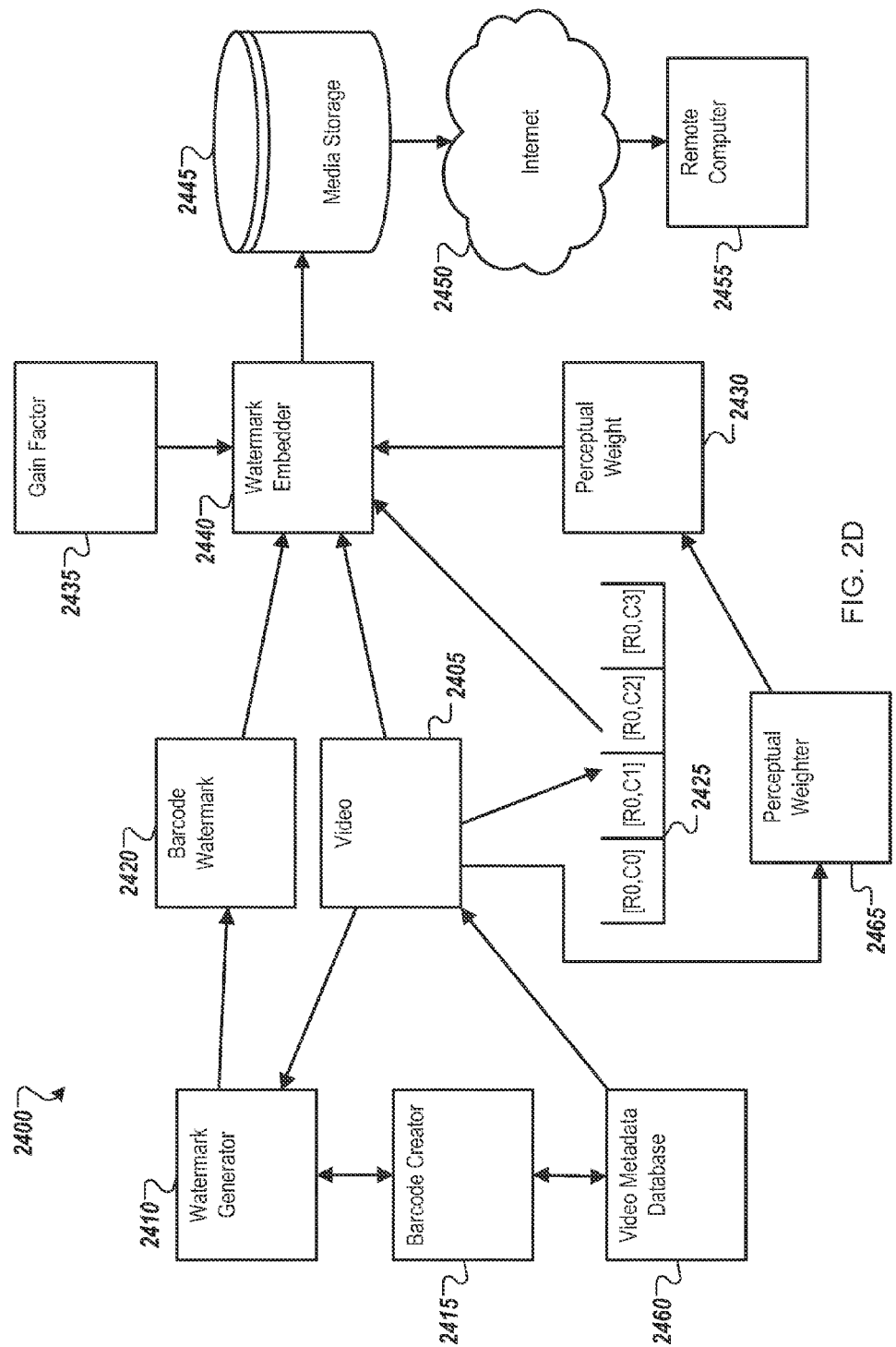
FIG. 2D is a block diagram showing another example video distribution system used to distribute a watermarked video.

FIG. 2D is a block diagram showing an example video distribution system (2400) used to distribute a watermarked video (2405) that has associated metadata. In some implementations, the video (2405) can be requested. The video (2405) can have associated metadata stored in a video metadata database (2460). A watermark generator (2410) can create a barcode-type watermark (2420) using a barcode creator (2415). The barcode creator (2415) can associate the barcode-type watermark (2420) with an entry in the video metadata database (2460), and the metadata can be related to the video (2405).

A watermark embedder (2440) can embed the barcode-type watermark (2420) into each scan line (2425) of the video (2405). The watermark embedder (2440) can use a gain factor (2435) and a perceptual weight (2430) to calculate a one dimensional data pattern for each scan line (2425). The perceptual weight (2430) can be calculated at each pixel in each scan line (2425) by a perceptual weighter (2365), such as described above.

The video (2405) can be stored in a media storage (2445). The Internet (2450) can provide a remote computer (2455) access to the media storage (2445). In some implementations, some or all of the components in the system (2400) can be computer software components such as programs, daemons, services, or data files. In some implementations, some or all of the components in the system (2400) can be computer hardware components such as hard disks, network cables, application-specific integrated circuits or general purpose microprocessors. Moreover, the components in the system (2400) need not be separated as shown; for example, the barcode creator (2415) can be integrated into the watermark generator (2410).

Figure 3A:
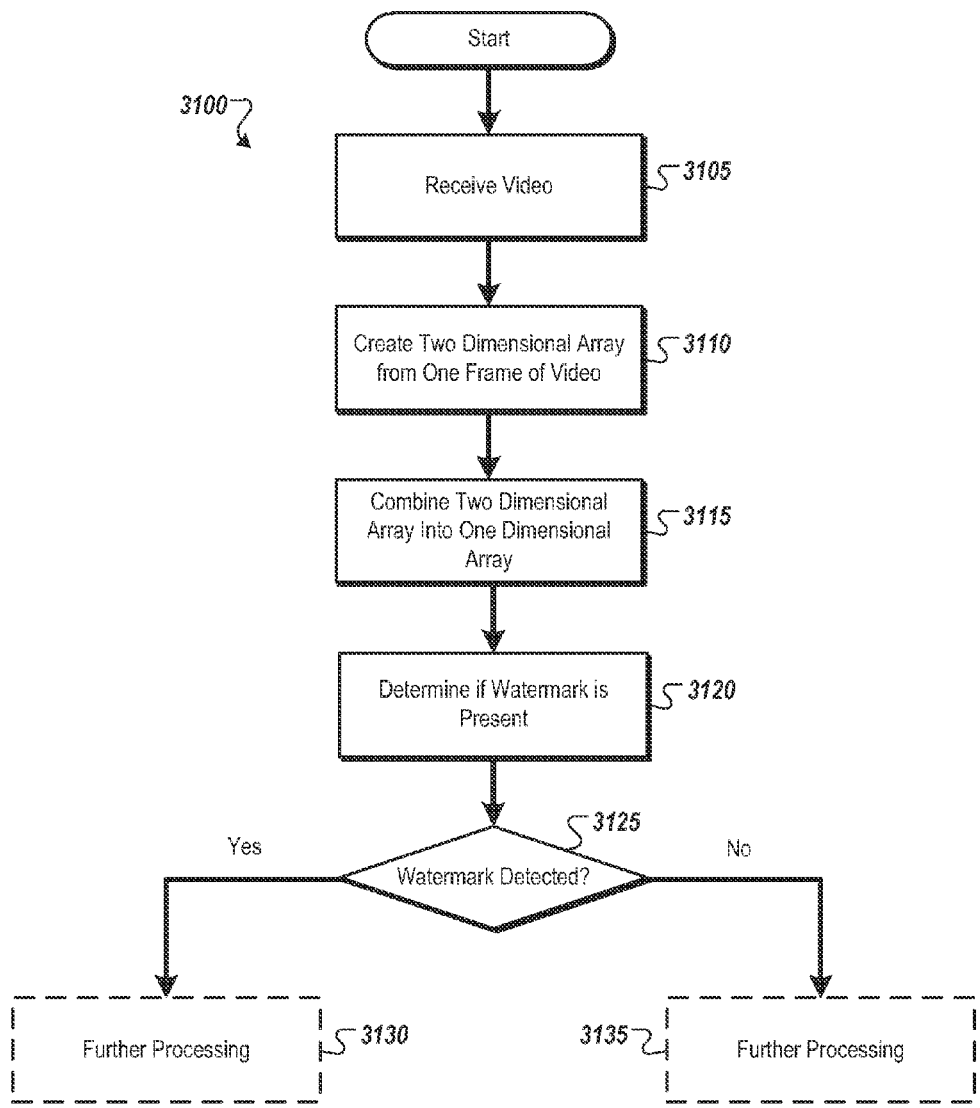
FIG. 3A is a flow chart showing an example process of detecting a watermark in video data.

FIG. 3A is a flow chart showing an example process (3100) of detecting a watermark in video data. In some implementations, a video can be received (3105) by a computer that can detect watermarks. In some implementations, in addition to receiving the video, the process (3100) can also involve displaying the video, adding the video to a video library, and testing the video to ensure that a watermark was correctly applied.

A two dimensional array can be created (3110) from a frame of the video. In some implementations, this two dimensional array can contain the pixel value with the location of the pixel corresponding to the location of the pixel value. In some implementations, this two dimensional array can contain information related to brightness, tone, or other information from the video received.

Data in the two dimensional array can be combined (3115) into a one dimensional array. In some implementations, this combining can involve calculating the sum or average of values in a row or column, as well as other operations, such as shifting (e.g., shift the pattern by one column on each successive scan line). In some implementations, this combining can involve multiple groups of random or periodic samples from the two dimensional array. In some implementations, this combining can involve the aggregation of multiple collections of data from the two dimensional array. Moreover, sums along diagonals can be used as well.

A determination (3120) can be made of the watermark's presence or absence. In some implementations, this can include a distinct positive or negative determination. In some implementations, this can include a confidence rating indicating how likely or unlikely it has been determined that a watermark is present or absent. If a watermark is detected (3125), further processing (3130) can be performed on the video. In some implementations, this processing can include collecting metadata related to the video, updating a viewership database, and/or video editing.

If a watermark was not detected (3125), further processing (3135) can be performed on the video, or not performed, depending on the implementation. It will be appreciated that in some implementations, further processing (3130) of a video found to have a watermark can be partially the same as further processing (3135) of a video found not to have a watermark. In some implementations, both sets of processing (3130 and 3135) operations can relate to viewership or ratings collection, matching metadata to a video, parental control schemes, displaying advertising information and/or machine control of a device that can display the video.

Figure 3B:
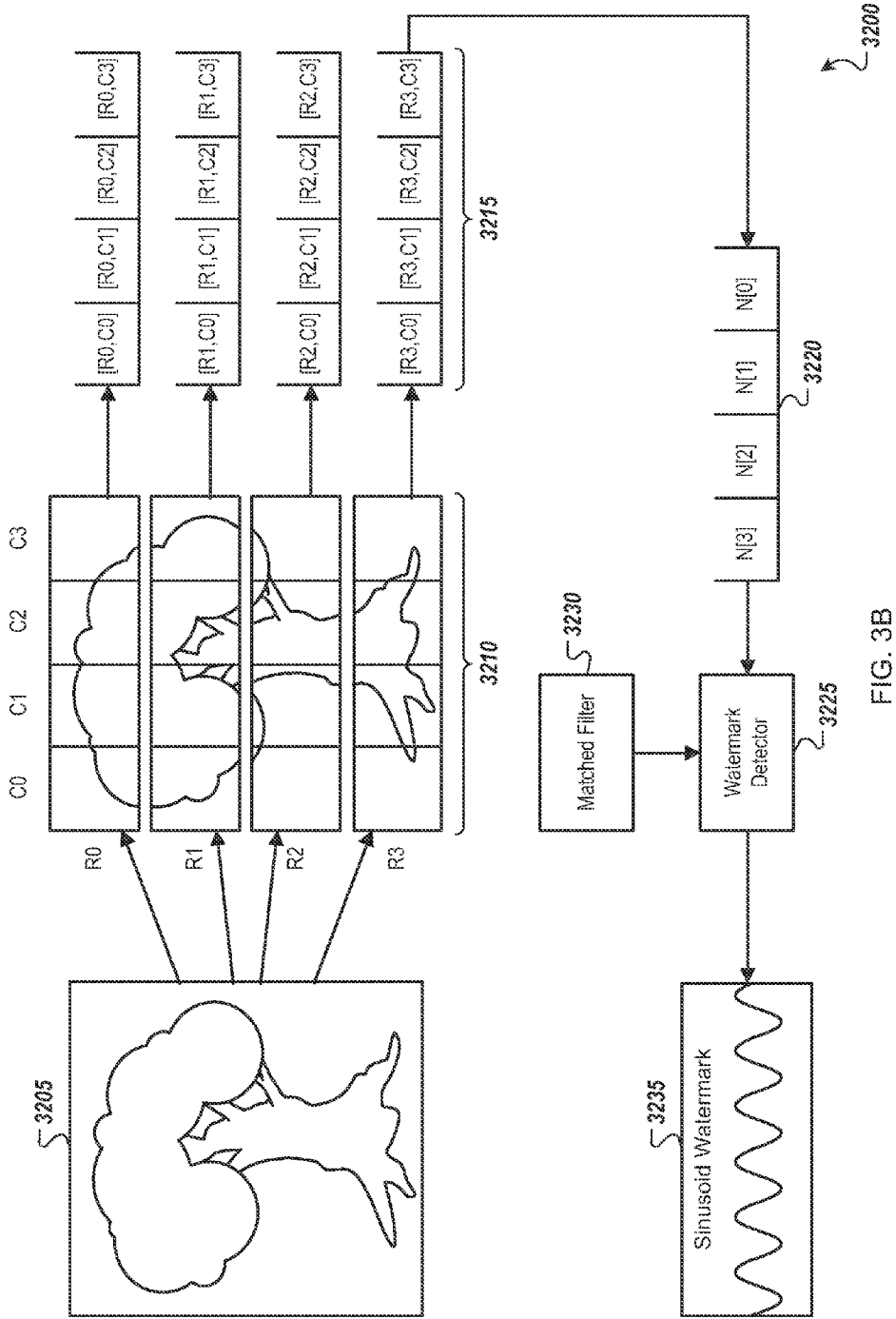
FIG. 3B is a block diagram showing another example process of detecting a watermark in video data.

FIG. 3B is a block diagram showing an example process (3200) of detecting a one dimensional watermark (3235) in a frame (3205) of a video. In some implementations, the frame (3205) can be separated by one or more scan lines (3210). The scan lines (3210) can be divided into rows and columns, such as described above in connection with FIG. 2B.

The scan lines (3210) can be treated as a two dimensional array (3215). The two dimensional array (3215) can be combined into a one dimensional array (3220). The one dimensional array (3220) can be examined by a watermark detector (3225) using a matched filter (3230) to determine if the sinusoid watermark (3235) is present in the frame (3205). Note that unlike a traditional two dimensional linear filter, the matched filter (3230) need not employ a number of multiply-add operations on the order of R×C×N to calculate the matched filter response for an entire image, where R is the number of rows in the image, C is the number of columns in the image, and N is the number of points in the impulse response of the matched filter. This is because the pattern of the present watermark is one dimensional, rather than two dimensional. Thus, detection can be performed by first summing over all the columns to produce an array of C numbers, and then the amount of computation used to detect the watermark can be reduced to C×(R+N), which is typically much smaller than R×C×N.

Figure 3C:
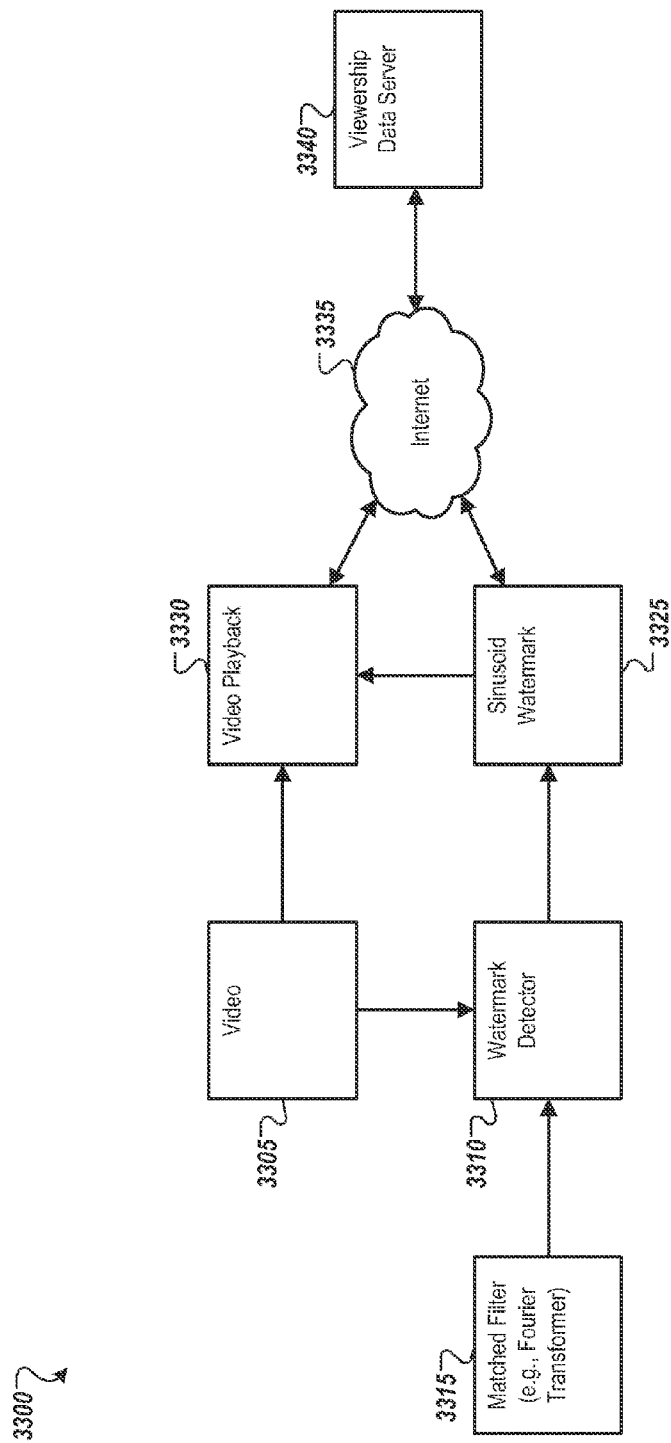
FIG. 3C is a block diagram showing an example video analysis system used to view a video.

FIG. 3C is a block diagram showing an example video analysis system (3300) used to view a video (3305). In some implementations, the video (3305) can be examined to determine if it contains a sinusoid watermark (3325). A watermark detector (3310) can analyze the video (3305) using a matched filter (3315). In some implementations, the matched filter (3315) can include a Fourier transformer or an element capable of performing a Fourier transformation. Note that employing a Fourier transform to detect a sinusoid watermark can provide significant advantages when dealing with video image that have been cropped since the Fourier transform can still identify the sinusoid even if the peak of the sinusoid isn't in the expected place, without requiring a trial and error approach to watermark detection. Moreover, the Fourier transform can provide significant speed advantages in watermark detection.

The presence of the sinusoid watermark (3325) can be detected by the watermark detector (3310). The watermark (3325) can be passed to a video playback system (3330). Video playback system (3330) can record the watermark (3325) and communicate with a viewership data server (3340) over the Internet (3335) to report viewership statistic information.

In some implementations, some or all of the components in the system (3300) can be computer software components such as programs, daemons, services, or data files. In some implementations, some or all of the components in the system (3300) can be computer hardware components such as hard disks, network cables, applications-specific integrated circuits or general purpose microprocessors. Moreover, the components in the system (3300) need not be separated as shown; for example, the matched filter (3315) can be integrated into the watermark detector (3310), which can be integrated into the video playback system (3330).

Figure 3D:
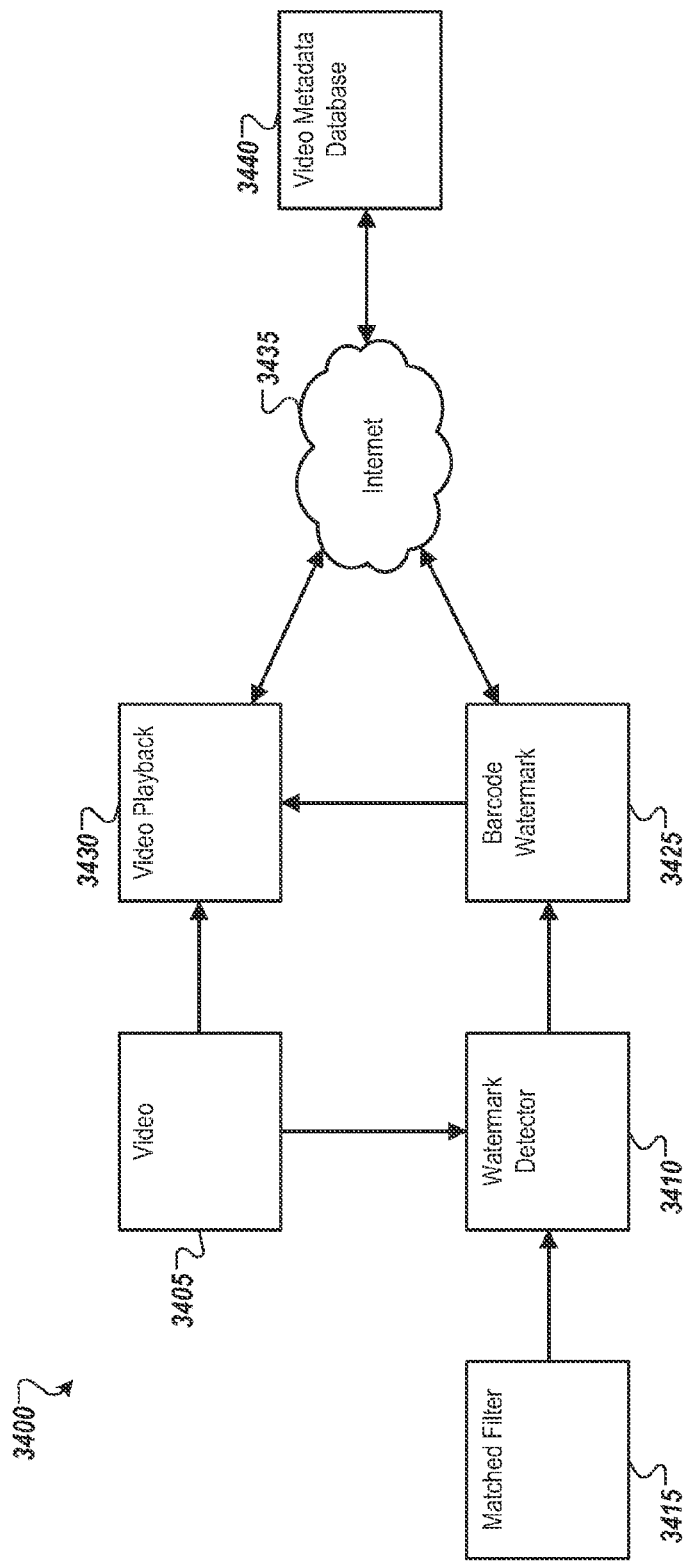
FIG. 3D is a block diagram showing another example video analysis system used to view a video.

FIG. 3D is a block diagram showing an example video analysis system (3400) used to view a video (3405) that can have associated metadata. In some implementations, the video (3405) can be examined to determine if it contains a barcode-type watermark (3425). A watermark detector (3410) can analyze the video (3405) using a matched filter (3415). The presence of the barcode-type watermark (3425) can be detected by the watermark detector (3410). The barcode-type watermark (3425) can be passed to a video playback (3430) system. The video playback (3430) can perform further processing on video (3405).

The video playback (3430) can communicate with a video metadata database (3440) over the Internet (3435) and use the barcode-type watermark (3425) to look up any metadata associated with the video. The metadata can then be displayed with the video (3405) by the video playback (3430).

In some implementations, some or all of the components in the system (3400) can be computer software components such as programs, daemons, services, or data files. In some implementations, some or all of the components in the system (3400) can be computer hardware components such as hard disks, network cables, applications-specific integrated circuits or general purpose microprocessors. Moreover, the components in the system (3400) need not be separated as shown; for example, the matched filter (3415) can be integrated into the watermark detector (3410), which can be integrated into the video playback system (3430).

Figure 4:
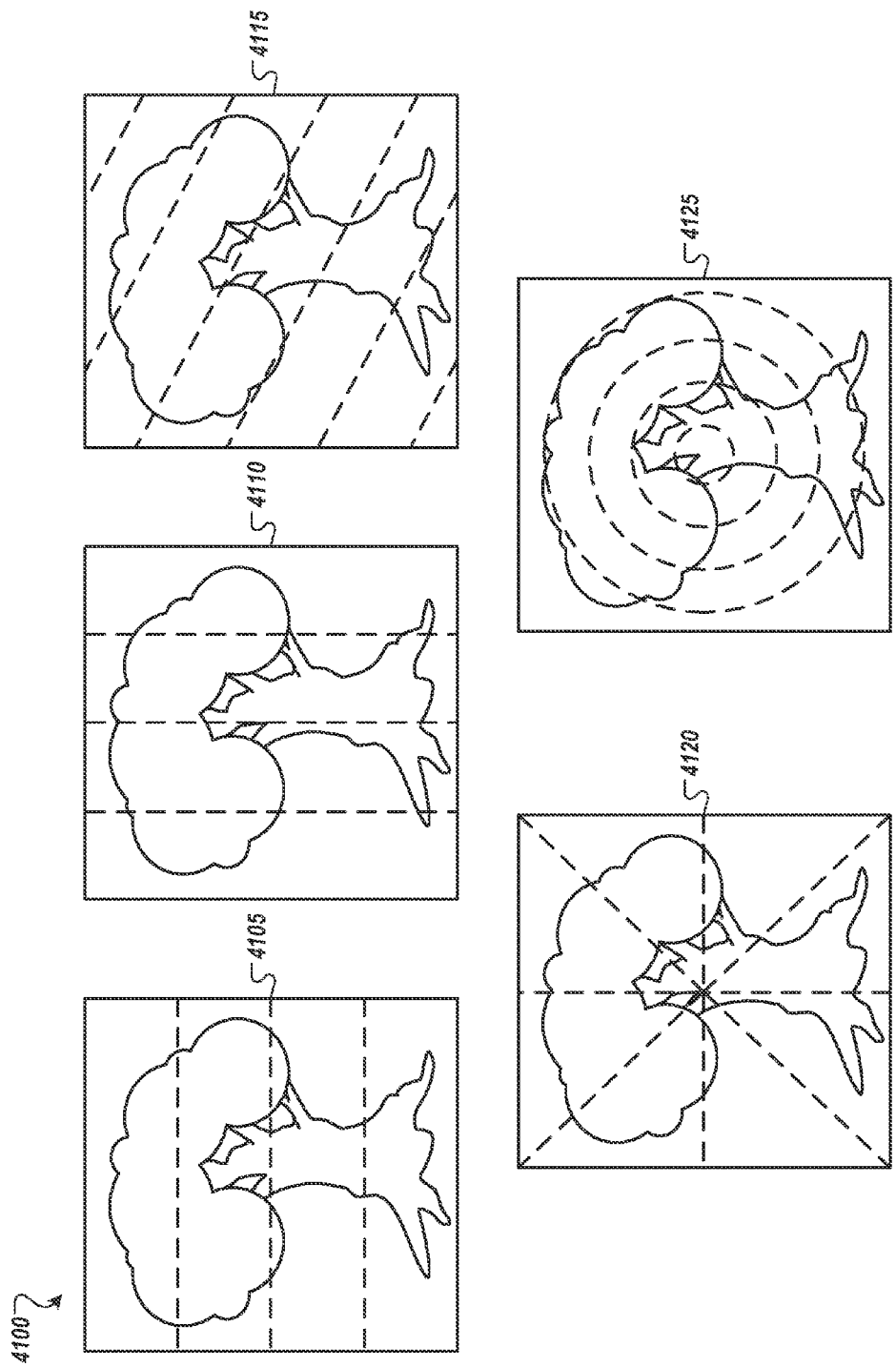
FIG. 4 is a list of video frames showing examples of different one dimensional data lines within each frame.

FIG. 4 is a list of video frames showing examples of different one dimensional data lines within each frame. A single frame of a video can be divided in multiple ways (4100) to identify one dimensional data lines for watermark encoding. In some implementations, horizontal data lines (4105) can be used to encode a watermark. In some implementations, vertical data lines (4110) can be used to encode a watermark. In some implementations, diagonal data lines (4115) can be used to encode a watermark. In some implementations, radial data lines (4120) can be used to encode a watermark. In some implementations, concentrically circular data lines (4125) can be used to encode a watermark. Note that the radial data lines (4120) and concentrically circular data lines (4125) implementations can facilitate the use of these techniques with video data that may be rotated. Moreover, more than one of these different types of data lines can be used within the same video, including within the same frame of the video.

It should be noted that the data lines are one dimensional in that each encoding of a watermark is spread across only a single dimension within a video frame, rather than across the entire two dimensional surface of the video frame. This is true even if that single dimension is curved within the two dimensional space, as is the case with the concentrically circular data lines (4125).

Figure 5:
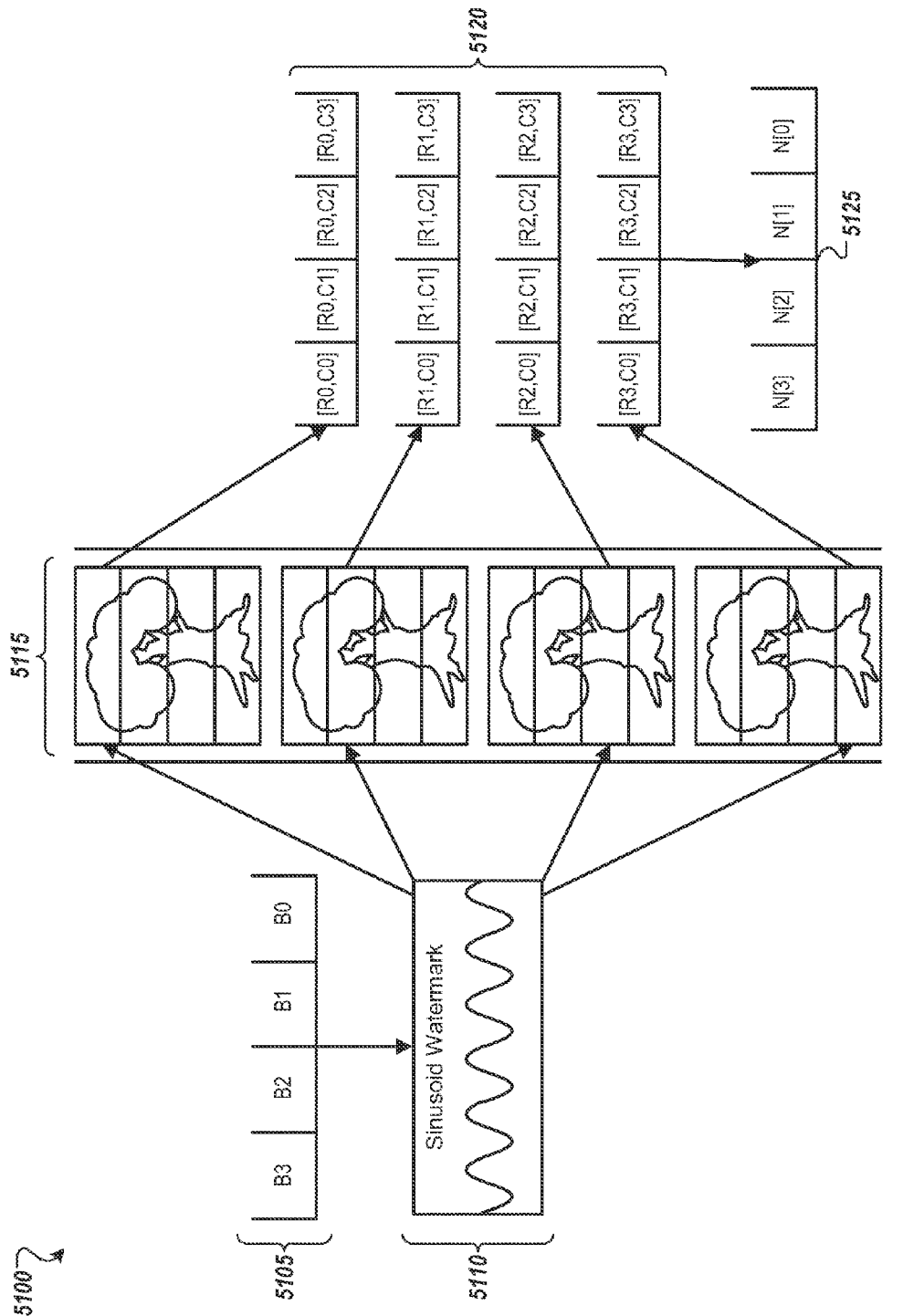
FIG. 5 is a block diagram showing an example process of embedding and detecting a watermark in different scan lines of different frames in a video.

FIG. 5 is a block diagram showing an example process (5100) of embedding and detecting a watermark in different scan lines of different frames in a video. A watermarking system can embed the same watermark on one dimensional data lines in different frames of a video (5115). Thus, the same one dimensional watermark pattern can be applied to scan lines that span multiple frames. In some implementations, one or more bits of data (5105) can be used to create a sinusoid watermark (5110). The sinusoid watermark (5110) can be embedded into different one dimensional data lines of different frames of the video (5115).

When examining different frames of the video (5115), a two dimensional array (5120) can be constructed using different one dimensional data lines of different frames of the video (5115). The two dimensional array (5120) can be combined into a one dimensional array (5125), which can be examined to determine if a watermark is present in the video. Moreover, multiple different sinusoid watermarks (5110) can be applied to the video (5115) within a given frame, to different frames, or both.

In some implementations, a watermark can be embedded into a portion of the video frame image. A video frame can be divided into quadrants or different regions, and each quadrant or region can have a different watermark applied therein. Various tiles (e.g., hexagonal tiles), or vertical, horizontal, and/or diagonal stripes can be used. Moreover, in some implementations, the regions to be watermarked can be selected based on the image, including an analysis of what portions of the image constitute good places to hide the watermark(s), such as described in further detail above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions tangibly encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the systems and techniques described herein can be employed with still images rather than with video data.

What is claimed is:

1. A computer-implemented method comprising:
receiving video data comprising multiple one dimensional data lines;
combining the one dimensional data lines to form a one dimensional array of numbers;
analyzing the one dimensional array of numbers to detect a watermark pattern previously applied to each of the one dimensional data lines; and
outputting an indication of a match, to trigger further processing with respect to the video data, when the analyzing indicates the watermark pattern has been detected.

2. The method of claim 1, wherein the watermark pattern comprises a sinusoid.

3. The method of claim 2, wherein the analyzing comprises using a matched filter to detect the watermark pattern.

4. The method of claim 3, wherein the analyzing comprises employing a Fourier transform to detect the sinusoid.

5. The method of claim 1, wherein the one dimensional data lines comprise scan lines of the video data, and the combining comprises adding the scan lines together to form the one dimensional array of numbers.

6. The method of claim 5, wherein the scan lines comprise scan lines from different frames of the video data.

7. One or more computer-readable storage devices comprising processor-executable instructions that, responsive to execution by a processor, cause a computer system to implement operations comprising:
receiving video data comprising multiple one dimensional data lines;
combining the one dimensional data lines to form a one dimensional array of numbers;
analyzing the one dimensional array of numbers to detect a watermark pattern previously applied to each of the one dimensional data lines; and
outputting an indication of a match, to trigger further processing with respect to the video data, when the analyzing indicates the watermark pattern has been detected.

8. The one or more computer-readable storage devices of claim 7, wherein the watermark pattern comprises a sinusoid.

9. The one or more computer-readable storage devices of claim 8, wherein the analyzing comprises using a matched filter to detect the watermark pattern.

10. The one or more computer-readable storage devices of claim 9, wherein the analyzing comprises employing a Fourier transform to detect the sinusoid.

11. The one or more computer-readable storage devices of claim 7, wherein the one dimensional data lines comprise scan lines of the video data, and the combining comprises adding the scan lines together to form the one dimensional array of numbers.

12. The one or more computer-readable storage devices of claim 11, wherein the scan lines comprise scan lines from different frames of the video data.

13. A system comprising:
a user interface device; and
one or more computers operable to interact with the user interface device and to perform operations comprising:
receiving video data comprising multiple one dimensional data lines;
combining the one dimensional data lines to form a one dimensional array of numbers;
analyzing the one dimensional array of numbers to detect a watermark pattern previously applied to each of the one dimensional data lines; and
outputting an indication of a match, to trigger further processing with respect to the video data, when the analyzing indicates the watermark pattern has been detected.

14. The system of claim 13, wherein the watermark pattern comprises a sinusoid, the analyzing comprises using a matched filter to detect the watermark pattern, and the matched filter employs a Fourier transform to detect the sinusoid.

15. The system of claim 13, wherein the one dimensional data lines comprise scan lines of the video data, and the combining comprises adding the scan lines together to form the one dimensional array of numbers.

16. The system of claim 15, wherein the scan lines comprise scan lines from different frames of the video data.

17. A system comprising:
a user interface device; and
one or more computers operable to interact with the user interface device and to perform operations comprising:
receiving video data comprising video scan lines;
combining at least two of the video scan lines to form a one dimensional array of numbers;

analyzing the one dimensional array of numbers to detect a watermark pattern previously applied to each of the at least two of the video scan lines; and outputting an indication of a match, to trigger further processing with respect to the video data, when the analyzing indicates the watermark pattern has been detected.

18. The system of claim 17, wherein the combining comprises adding the at least two of the video scan lines together to form the one dimensional array of numbers.

19. The system of claim 17, wherein the combining comprises combining video scan lines from different frames of the video data, including at least two video scan lines from each of the different frames, to detect multiple bits of data encoded in the watermark pattern.

20. The system of claim 17, wherein the watermark pattern is previously applied by using a gain factor and a perceptual weighting to calculate a one dimensional data pattern for each scan line.

* * * * *